Oct. 12, 1926.
G. W. CARR
1,602,647
MASTER VALVE
Filed Nov. 7, 1925
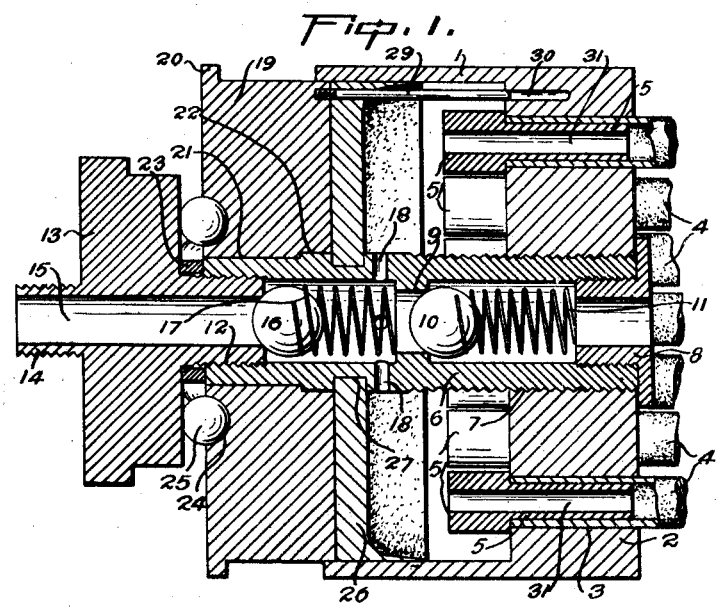
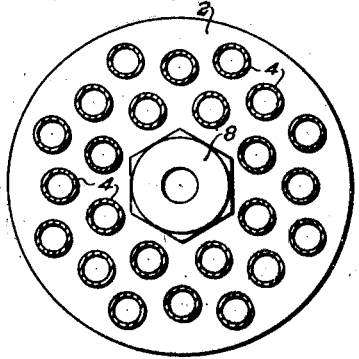
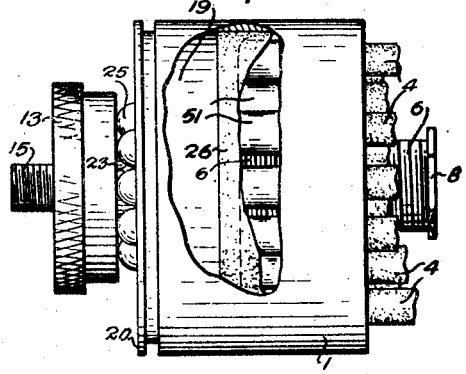
INVENTOR
GEORGE W. CARR Patented Oct. 12, 1926.

1,602,647

UNITED STATES PATENT OFFICE.

GEORGE WORTHINGTON CARR, OF BUFFALO, NEW YORK.

MASTER VALVE.

Application filed November 7, 1925. Serial No. 67,582.

My invention relates to improvements in valves of the type which are more particularly designated as master valves in which a unitary valve member controls the passage of fluid through a plurality of conduits and the object of the invention is to construct a valve of this character which will simultaneously and equally control the passage of fluid through a plurality of outlet conduits which pass therefrom and a further object of the invention is to incorporate a safety valve in the master valve which can be adjusted to open at a predetermined pressure and so prevent the further passage of fluid through the outlet conduits. A still further object of my invention is to provide means for preventing the fluid in the valve chamber having egress through the inlet orifice before the valve is manually closed.

Another object of my invention is to provide a valve having a relatively large fluid chamber therein which will permit the equal distribution of fluid to each of the outlet conduits, and a final object of the invention is to construct a valve mechanism wherein the closing of the valve makes each of the conduits become independent of the other whereby any passage of fluid therebetween is cut off.

My invention consists of a master valve constructed and arranged all as hereinafter more particularly described and illustrated in the accompanying drawing in which:

Fig. 1 is a transverse sectional view through the center of my valve, the valve being shown in the open position.

Fig. 2 is a reduced, side elevational view thereof, the valve being shown in the closed position, part of the side wall being broken away to disclose the means whereby the valve is closed, and, Fig. 3 is an end elevational view of my valve showing the outlet conduits.

Like characters of reference indicate corresponding parts in the different views.

1 is my valve casing which is of cylindrical form and provided in one end with an integrally formed end plate 2, such end plate having a plurality of orifices 3 therein into which are inserted the ends of the outlet conduits 4. 5 are a plurality of nipples positioned in the orifices 3 in the inner face of the plate 2, being inserted into the ends of the outlet conduits 4, and having heads 51 projecting equi-distantly from the inner face of the plate 2.

A hollow stem 6 is provided centrally in the valve casing 1, one end being threaded into a centrally disposed orifice 7 in the plate 2. The stem 6 is also interiorly threaded at this end and adapted to receive a shouldered bushing 8 which is threaded thereinto and 9 is a circular shoulder provided in the bore of the stem 6 intermediately of its length. 10 is a ball valve adapted to be seated upon the circular shoulder 9 being held in the closed position by means of the spiral spring 11 which extends between such ball and the inner face of the bushing 8. It will be seen that in order to alter the tension of the spring 11 upon the ball 10 that it is merely necessary to screw the shoulder 8 slightly in or out of the sleeve as desired.

The opposite end of the stem 6 is also interiorly threaded and adapted to receive a threaded, reduced end 12 of a knurled thumb screw 13 upon the outer face of which is provided a screw connection 14 which is adapted to be connected to the source of fluid supply and 15 is a passage extending through the connection 14 and the screw 13 and communicating with the interior of the stem 6. 16 is a second ball valve adapted to be inserted into the interior of the stem 6 and rest against the face of the reduced portion 12 being retained in its closed position by means of a spiral spring 17 which extends between such ball 16 and the adjacent face of the circular shoulder 9. 18 are a plurality of orifices leading from the interior of the stem 6 to the interior of the valve casing 1.

For closing the open end of the valve casing 1 I provide a circular plate 19 having a shoulder 20 formed at its outer face, such plate being of the same diameter as the interior of the casing 1 and adapted to be slidable therein, being freely mounted upon the stem 6 which passes through a centrally positioned orifice 21, the inner end of such orifice being enlarged to receive a collar 22 integrally formed upon the stem 6. 23 is a lock washer inserted between the inner face of the head of the knurled thumb screw 13 and the outer end of the stem 6. I also provide a ball race 24 upon the outer face of the plate 19 surrounding the orifice 21, and 25 are a plurality of ball bearings mounted in such race and adapted to bear against the inner face of the head of the knurled thumb screw 13.

Upon the inner face of the plate 19 I provide a resilient washer 26 constructed of rubber or like material, an air tight joint being formed between its outer edge and the inner face of the casing 1. For insuring a tight closure at this point I provide a circular flange of tapering cross section on the periphery of the washer, such flange also bearing against the inner wall of the casing, being tightly held in engagement therewith when fluid is admitted to the casing under pressure. The washer 26 is secured in a groove 27 in the spindle 6.

By the provision of the lock washer between the inner face of the head of the thumb screw 13 and the outer end of the spindle 6 it will be seen that the thumb screw is securely locked to the spindle and when rotated will rotate the spindle in the threaded orifice 7 of the plate 2 thus moving the spindle 6, washer 26, and plate 19 to and fro in the casing depending upon the direction in which the thumb screw 13 is turned. For preventing the plate 19 and washer 26 being frictionally carried around with the spindle 6 when it is rotated, I provide a longitudinally extended pin 29, one end of which is secured in the inner face of the plate 19 passing through the washer 26 and extending into a longitudinal orifice 30 in the inner face of the member 2, the end of such pin 29 moving to and fro in the orifice 30 as the plate 19 approaches and leaves the plate 2.

The operation of my valve is as follows:

The screw connection 14 on the outer face of the thumb screw 13 is suitably connected with the source of fluid supply, the thumb screw having been rotated in an anti-clockwise direction to move the plate 19 out of the casing 1 into the position shown in Figure 1. When the fluid is admitted to the orifice 15 it passes inwardly impinging against the ball 16, moving it inwardly and overcoming the resistance of the spring 17. The fluid now passes around the ball 16 and enters the interior of the spindle 6, its further progress through the spindle being prevented by the ball valve 10 held in position by the spring 11. As the fluid cannot pass the ball valve 10 it leaves the interior of the spindle through the orifices 18 and passes into the interior of the casing 1 from where it passes through the passages 31 in the nipples 5 into the outlet fluid conduits 4, an equal fluid pressure being admitted into each conduit.

When the fluid in the reservoirs to which the conduits lead rises to a predetermined pressure an equal pressure will be set up in the valve casing 1 and consequently in the interior of the spindle 6, when this occurs a sufficient pressure will be reached to move the ball valve 10 off its seating and permit the fluid to pass through the other end of the spindle 6 into the atmosphere. The provision of this safety valve very efficiently prevents an over-pressure being reached in the fluid reservoirs to which the conduits lead.

In order to open the valve to release the fluid from the several fluid reservoirs to which the valve is connected it is merely necessary to turn the thumb screw 13 in an anti-clockwise direction thus removing the washer 26 from the heads 51 of the nipples which will permit the air in the reservoirs to enter the valve chamber. Any suitable instrument such as a small rod or piece of wire may be inserted through the passageway 15 to open the ball valve 16 and release the fluid from the valve chamber.

When the reservoirs are filled and it is required to close the valve the knurled thumb screw 13 is rotated in a clockwise direction, moving the plate 19 inwardly in the casing 1 until the inner face of the washer 26 comes in contact and is screwed down upon the outer faces of the nipple heads 51 as illustrated in Figure 2. When the valve is screwed into this position it will be seen that communication between the different conduits is cut off isolating the fluid contained in each conduit and its receptacle, each having an equal fluid pressure. For releasing the fluid from the respective fluid receptacles it is merely necessary to rotate the thumb screw 13 in an anti-clockwise direction thus removing the washer 26 from the faces of the heads 51. By the provision of the ball-bearings 25 between the adjacent faces of the thumb screw and plate 19 I have successfully reduced the friction between the rotatable thumb screw and stationary plate to a minimum.

From the above description it will be seen that I have devised a master valve through which it is possible to supply fluid at an equal pressure to a plurality of sources and have also devised means for simultaneously cutting off the passage of fluid thereto, an equal fluid pressure being therefore obtained at each source. Furthermore I have devised means whereby a predetermined fluid pressure is only permitted to be reached; should this pressure be exceeded the safety valve opens and permits the excess fluid to pass out of the valve into the atmosphere. By the provision of the ball valve 16 I have provided a means for preventing a back pressure of fluid leaving the valve casing through the inlet opening.

What I claim as my invention is:—

1. A valve comprising a chamber having a fluid outlet orifice therein, a hollow spindle positioned in the chamber, a fluid inlet in the hollow spindle, means whereby the fluid is adapted to pass from the hollow spindle into the chamber, and means in the chamber and closing one end thereof adapted to be operated by said spindle for controlling the passage of fluid from the chamber into the outlet orifice.

2. A valve comprising a chamber having a fluid outlet orifice therein, a hollow spindle positioned in the chamber, a fluid inlet in the hollow spindle, means whereby the fluid is adapted to pass from the hollow spindle into the chamber, and a valve member closing one end of the chamber and having movement in the chamber for covering and uncovering the outlet orifice, said valve member adapted to be moved by said spindle.

3. A valve comprising a chamber having a fluid outlet orifice therein, a hollow spindle positioned in the chamber, a fluid inlet in the hollow spindle, means whereby the fluid is adapted to pass from the hollow spindle into the chamber and a safety valve in the hollow spindle adapted to open when a predetermined pressure is reached in the valve chamber.

4. A valve comprising a chamber having a fluid outlet orifice therein, a hollow open-ended spindle positioned in the chamber, one end of said spindle constituting a fluid inlet to the chamber and the other end of said spindle communicating with the atmosphere, means whereby the fluid is adapted to pass from the inlet end of the hollow spindle into the chamber, a pair of resiliently retained, normally closed valves in the hollow spindle, one of said valves being adapted to open to permit the passage of fluid under pressure into the valve chamber, and the other valve controlling the passage of the fluid from the valve chamber to the atmosphere through the hollow spindle, the resilient retaining means of the first-mentioned valve being weaker than the resilient retaining means of the second-mentioned valve so that the fluid pressure entering the valve chamber is sufficient to open the weaker valve and insufficient to open the stronger valve, the valve having the stronger resilient retaining means adapted to open to the atmosphere when a predetermined fluid pressure is attained in the valve chamber.

5. A valve comprising a chamber having a fluid outlet orifice therein, a hollow open-ended spindle positioned in the chamber having orifices therein communicating with the valve chamber, one end of said spindle constituting a fluid inlet to the chamber and the other end of said spindle communicating with the atmosphere, a pair of normally closed valves in the spindle, one on either side of the orifices which communicate with the valve chamber, one of said valves being adapted to open under a predetermined fluid pressure to permit such fluid to enter the valve chamber through the orifices in the spindle and the other valve being adapted to control the passage of fluid from the valve chamber through the end of the open-ended hollow spindle which communicates with the atmosphere and adapted to open when the fluid pressure in the chamber exceeds a predetermined amount.

6. A valve comprising a chamber having a plurality of fluid outlet orifices therein, nipples having heads thereon, each adapted to be inserted into an orifice so that the heads project equi-distantly inwardly into the chamber, means for permitting fluid pressure to enter the valve chamber comprising a spindle movable longitudinally in the casing, a valve washer closing one end of the chamber and rotatably mounted on the spindle and movable longitudinally therewith to come into and out of engagement with the nipple heads for controlling the passage of fluid through the nipples.

GEORGE WORTHINGTON CARR.